US011962654B2

(12) United States Patent
Tanaka et al.

(10) Patent No.: US 11,962,654 B2
(45) Date of Patent: Apr. 16, 2024

(54) COMMUNICATION SYSTEM, COMMUNICATION METHOD, COMMUNICATION APPARATUS, AND COMPUTER PROGRAM PRODUCT

(71) Applicant: KABUSHIKI KAISHA TOSHIBA, Tokyo (JP)

(72) Inventors: Yasuyuki Tanaka, Kawasaki Kanagawa (JP); Suh Wuk Kim, Ota Tokyo (JP); Hiroki Kudo, Kawasaki Kanagawa (JP); Sakie Nagakubo, Kawasaki Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 17/651,941

(22) Filed: Feb. 22, 2022

(65) Prior Publication Data

US 2022/0385729 A1  Dec. 1, 2022

(30) Foreign Application Priority Data

May 26, 2021 (JP) ................................ 2021-088343

(51) Int. Cl.
*H04L 67/125* (2022.01)
*H04W 4/38* (2018.01)
*H04W 84/18* (2009.01)

(52) U.S. Cl.
CPC ............. *H04L 67/125* (2013.01); *H04W 4/38* (2018.02); *H04W 84/18* (2013.01)

(58) Field of Classification Search
None
See application file for complete search history.

(56) References Cited

U.S. PATENT DOCUMENTS 9,809,159 B1 * 11/2017 Snyder .................... B60T 17/22
11,715,563 B1 * 8/2023 Fox .......................... G16H 50/30
705/2

(Continued)

FOREIGN PATENT DOCUMENTS

EP  3 115 981 A1  1/2017
JP  2006-209439 A  8/2006

(Continued)

OTHER PUBLICATIONS

D. Mills et al., "RFC 5905, Network Time Protocol Version 4: Protocol and Algorithms Specification," http://www.ietf.org/rfc/rfc5905.txt, 110 pages (62 page printout) (2010).

*Primary Examiner* — Chris Parry
*Assistant Examiner* — Abderrahmen Chouat
(74) *Attorney, Agent, or Firm* — Finnegan, Henderson, Farabow, Garrett & Dunner, LLP

(57) ABSTRACT

A communication system according to an embodiment includes a server system and one or more communication apparatuses. The server system includes a first hardware processor. The first hardware processor determines frequency information indicating processing frequency of predetermined processing executed by the communication apparatuses. The frequency information is determined on the basis of determination information affecting the predetermined processing. The first hardware processor transmits processing frequency of the predetermined processing to the communication apparatuses. The processing frequency is determined on the basis of the frequency information. The communication apparatuses each include a second hardware processor. The second hardware processor receives the processing frequency of the processing from the server system. The second hardware processor executes the predetermined processing on the basis of the received processing frequency.

11 Claims, 10 Drawing Sheets

(56) References Cited

U.S. PATENT DOCUMENTS

| | | | | |
|---|---|---|---|---|
| 2008/0309481 | A1* | 12/2008 | Tanaka | A61B 5/0002 |
| | | | | 340/286.01 |
| 2018/0295535 | A1* | 10/2018 | Kavars | G06F 1/28 |
| 2019/0020433 | A1* | 1/2019 | Pitigoi-Aron | H04W 56/001 |
| 2019/0362027 | A1* | 11/2019 | Jain | G06F 30/00 |
| 2020/0175852 | A1* | 6/2020 | Yamashita | G08G 1/127 |
| 2020/0196105 | A1* | 6/2020 | Hunter | G08B 21/0261 |
| 2021/0116913 | A1* | 4/2021 | Dingli | G05D 1/0276 |
| 2022/0124454 | A1* | 4/2022 | Lewin | G16Y 20/10 |
| 2022/0366354 | A1* | 11/2022 | Maiman | G06F 21/31 |
| 2023/0230043 | A1* | 7/2023 | Soma | G06Q 50/30 |
| | | | | 705/7.18 |

FOREIGN PATENT DOCUMENTS

| | | |
|---|---|---|
| JP | 2014-155133 A | 8/2014 |
| JP | 2018-77855 A | 5/2018 |
| JP | 6402456 B2 | 9/2018 |
| JP | 2019-160005 A | 9/2019 |

* cited by examiner

| CONCENTRATOR IDENTIFIER | SET PLACE | SENSOR TYPE | FREQUENCY LEVEL |
|---|---|---|---|
| C001 | ○○1 | A, B, C | HIGH |
| C002 | △△1 | B, D | INTERMEDIATE |
| C003 | □□2 | A, B, C, D | LOW |
| C004 | △△2 | A | HIGH |

FIG.4

| SENSOR TYPE | FREQUENCY LEVEL | PERIOD |
|---|---|---|
| A | HIGH | 5 MIN. |
| A | INTERMEDIATE | 10 MIN. |
| A | LOW | 15 MIN. |
| B | HIGH | 10 MIN. |
| B | INTERMEDIATE | 30 MIN. |
| B | LOW | 60 MIN. |
| C | HIGH | 10 MIN. |
| C | INTERMEDIATE | 15 MIN. |
| C | LOW | 20 MIN. |
| D | HIGH | 1 MIN. |
| D | INTERMEDIATE | 5 MIN. |
| D | LOW | 10 MIN. |

| NODE IDENTIFIER | ACQUISITION TIME | SENSOR DATA |
|---|---|---|
| $100_1$ | 12:00:00 | VALUE SD1 |
| $100_1$ | 12:00:00 | VALUE SD2 |
| $100_2$ | 12:00:00 | VALUE SD3 |
| ⋮ | ⋮ | ⋮ |
| $100_{13}$ | 12:30:00 | VALUE SD4 |
| $100_1$ | 12:30:00 | VALUE SD5 |

| SENSOR TYPE | PERIOD |
|---|---|
| A | 10 MIN. |
| B | 30 MIN. |
| C | 15 MIN. |
| D | 5 MIN. |

# COMMUNICATION SYSTEM, COMMUNICATION METHOD, COMMUNICATION APPARATUS, AND COMPUTER PROGRAM PRODUCT

CROSS-REFERENCE TO RELATED APPLICATIONS

This application is based upon and claims the benefit of priority from Japanese Patent Application No. 2021-088343, filed on May 26, 2021; the entire contents of which are incorporated herein by reference.

FIELD

An embodiment described herein generally relates to a communication system, a communication method, a communication apparatus, and a computer program product.

BACKGROUND

There is a proposed communication system that serves to collects, from communication apparatuses (nodes) on a network, sensor data acquired by sensors connected to the respective communication apparatuses. Moreover, there is a proposed technique for switching operation modes of sensors on the basis of information on weather alert announcement or the like. Operation modes for such a technique are three modes: "sensor stop/communication intermittent operation", "sensor stop/communication regular operation", and "sensor regular operation/communication regular operation", for example.

However, with the conventional techniques described above, the frequency for acquiring sensor data cannot be set in detail. With the technique of switching the operation modes of the sensor in the manner described above, it is only allowed to set the sensor to stop or operate. Therefore, when operating the sensor, it is not possible to further set, for example, frequency of the operation.

BRIEF DESCRIPTION OF THE DRAWINGS

FIG. 4 is a chart illustrating an example of a data structure of correspondence information;

DETAILED DESCRIPTION

Figure 1:
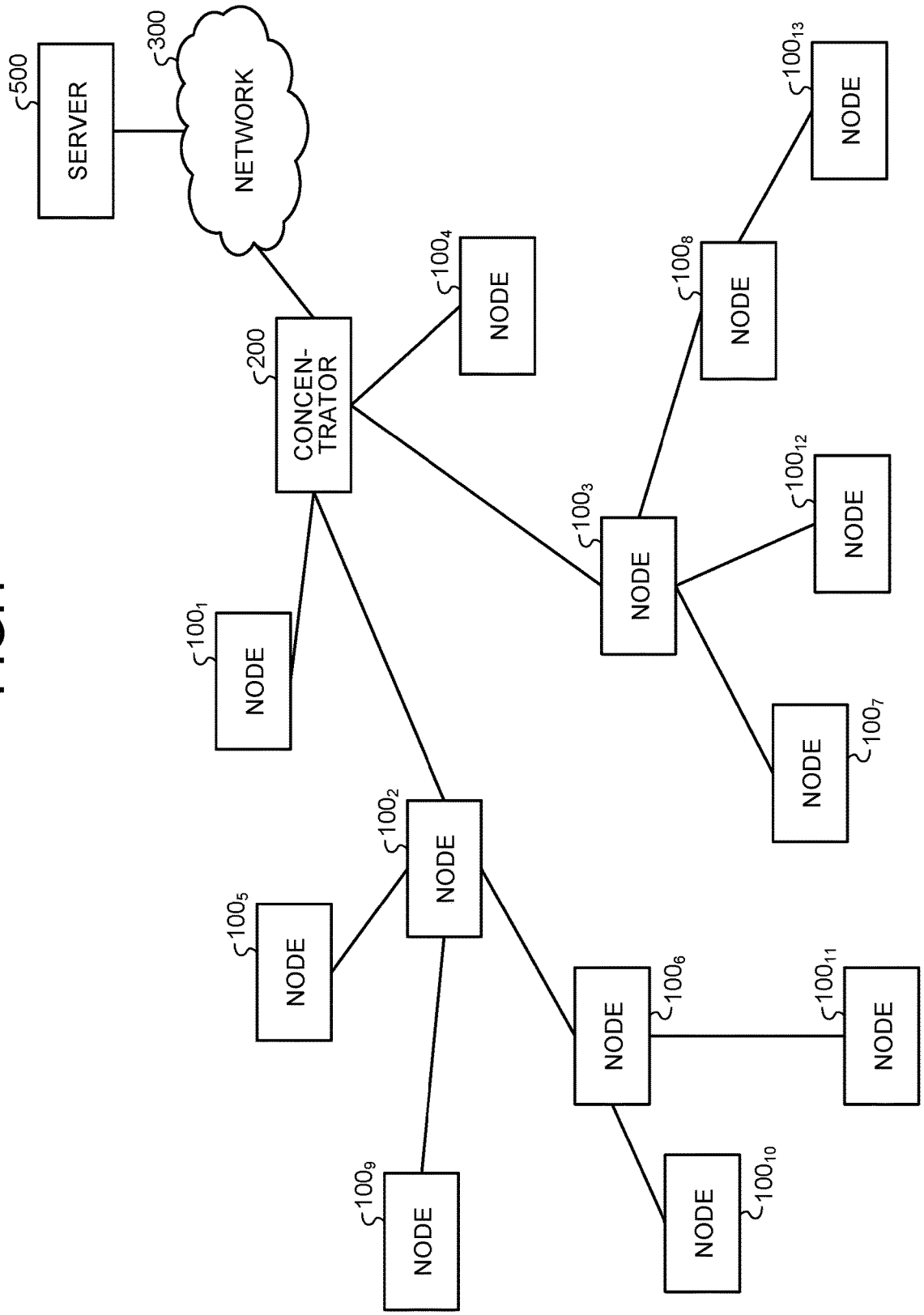
FIG. 1 is a block diagram illustrating a communication system of an embodiment.

A communication system according to an embodiment includes a server system and one or more communication apparatuses. The server system includes a first hardware processor. The first hardware processor determines frequency information indicating processing frequency of predetermined processing executed by the communication apparatuses. The frequency information is determined on the basis of determination information affecting the predetermined processing. The first hardware processor transmits processing frequency of the predetermined processing to the communication apparatuses. The processing frequency is determined on the basis of the frequency information. The communication apparatuses each include a second hardware processor. The second hardware processor receives the processing frequency of the processing from the server system. The second hardware processor executes the predetermined processing on the basis of the received processing frequency.

Hereinafter, preferred embodiments of a communication apparatus, a communication method, a computer program product, and a communication system according to the present invention will be described in detail with reference to the accompanying drawings.

As described above, in the conventional techniques, the frequency of processing (for example, processing of acquiring sensor data) executed by a communication apparatus cannot be set in a more detailed manner. Moreover, with the communication system described above, a control for synchronizing acquisition timings (sensing timings) of sensor data may be necessary in some cases.

The acquisition timing can be controlled by, for example, a technique that causes each of the communication apparatuses to have a reception function of Global Positioning System (GPS), and a technique that distributes absolute time on the basis of IETF RFC 5905 (Network Time Protocol: NTP).

However, such techniques may cause a problem that a function for controlling the timing is complicated. For example, with a technique using the GPS, the GPS is not always usable at places where the sensors are installed, and the power consumption increases. With the technique that distributes the absolute time, the control traffic increases, and it is necessary to provide an additional memory and control for managing the absolute time in the communication apparatus.

The communication system according to the embodiment includes a server system that determines, on the basis of determination information affecting predetermined processing executed by the communication apparatus, frequency information indicating the processing frequency of the processing. The predetermined processing is processing of acquiring sensor data, for example. However, the predetermined processing is not limited thereto. In the present case, the server system determines the period of sensing (sensing period) of the sensor on the basis of the determination information such as information regarding the weather (weather information) of a place (area) where the communication apparatus is installed, information indicating occurrence of natural phenomena, and the like. The server system notifies the communication apparatus of the determined sensing period.

For example, with a communication system that monitors environment information such as temperatures, barometric pressures, flow of rivers, water levels of lake surfaces, or seismic motions, it is necessary to reduce the acquisition frequency of sensor data in order to reduce power consumption. However, if the acquisition frequency of sensor data is excessively lowered, sufficient monitoring cannot be performed. In the present embodiment, the acquisition frequency of the sensor data is determined on the basis of the determination information (weather information and the like). This makes it possible to adjust the acquisition frequency of the sensor data as necessary.

In the communication system according to the embodiment, the absolute time is not managed by the communication apparatus itself but, instead, a reference number serving as a reference for controlling the timing is distributed from a concentrator (an example of a device that collects sensor data of the communication apparatus). The communication apparatus determines the timing of processing (acquisition timing of sensor data and the like) on the basis of the reference number.

FIG. 1 is a diagram illustrating a configuration example of the communication system according to the embodiment. As illustrated in FIG. 1, the communication system according to the embodiment includes a concentrator 200, nodes $100_1$ to $100_{13}$ (each being an example of the communication apparatus), and a server 500.

The nodes $100_1$ to $100_{13}$ transmit the sensor data acquired by respective sensors connected thereto (or built-in sensors) to the concentrator 200. The nodes $100_1$ to $100_{13}$ may be formed in the same configuration, so that those may simply be referred to as the nodes (or node) 100 when not necessary to be distinguished from each other. The number of nodes 100 is not limited to thirteen, but may be any desired number.

The concentrator 200 is a device (concentrator device) that concentrates the sensor data transmitted from each of the nodes 100.

The concentrator 200 and the nodes $100_1$ to $100_{13}$ constitute a wireless multi-hop network. Communication within the wireless multi-hop network is controlled by means of time division multiplexing, for example. While any desired protocol may be employed as the wireless communication method, wireless communication methods such as IEEE 802.11, IEEE 802.15.4, or the like can be applied thereto.

The concentrator 200 is connected to the server 500 over a network 300. While the network 300 may have any desired network form, examples of network forms include a wide area network like the Internet, a closed network in a wide area, a local network such as a corporate network, for example.

The concentrator 200 and the network 300 may be connected by a wired connection using an Ethernet (registered trademark) cable, an optical fiber, or the like, or may be connected by a wireless connection using a cellular network or a satellite link.

The concentrator 200 and the server 500 are examples of the server system. The server system of FIG. 1 is an example using two server devices that are the concentrator 200 and the server 500. The server system may be implemented as a logically or physically single server device that includes functions of both of the concentrator 200 and the server 500.

While only one concentrator 200 is illustrated in FIG. 1, the communication system may include two or more concentrators 200. In that case, each of the concentrators 200 together with one or more nodes 100 configures a wireless multi-hop network to receive (collects) sensor data from each of the nodes 100.

Figures 2, 3:
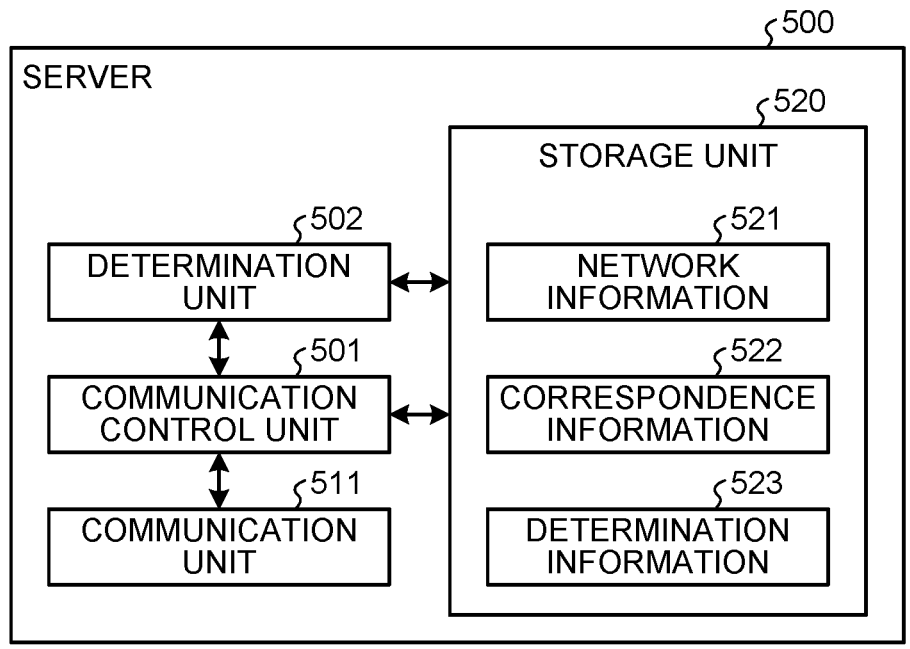
FIG. 2 is a functional block diagram of a server.
FIG. 3 is a chart illustrating an example of a data structure of network information.

Next, a functional configuration example of the server 500 will be described. FIG. 2 is a block diagram illustrating an example of the functional configuration of the server 500. As illustrated in FIG. 2, the server 500 includes a communication control unit 501, a determination unit 502 (an example of a first determination unit), a communication unit 511, and a storage unit 520.

The storage unit 520 stores various kinds of data used in the server 500. For example, the storage unit 520 stores network information 521, correspondence information 522, and determination information 523. The storage unit 520 may be configured with various storage media used in general, such as a flash memory, a memory card, a random access memory (RAM), a hard disc drive (HDD), and an optical disc.

The network information 521 includes management information for each of the concentrators 200 (wireless multi-hop networks). FIG. 3 is a chart illustrating an example of a data structure of the network information 521. Note that FIG. 3 illustrates an example of the network information 521 including management information regarding four concentrators 200.

As illustrated in FIG. 3, the network information 521 includes concentrator identifiers, set places, sensor types, and frequency levels. The concentrator identifier is an example of identification information for identifying the concentrator 200. Instead of the concentrator identifier, the network address of the concentrator 200 may be used as well.

The set place indicates, for example, the place where the concentrator 200 (server system) is set. The set place can be interpreted as indicating the set place of the wireless multi-hop network, the node 100, or the sensor connected to the node 100.

While a single set place is managed for a single concentrator 200 in FIG. 3, it is not intended to be limited thereto. For example, more than two set places may be managed for a single concentrator 200. The set places correspond to the following places or areas, for example.

A plurality of areas acquired by dividing an area where a wireless multi-hop network corresponding to the concentrator 200 exists Set places of each of the nodes 100 (or sensors 131 connected to the nodes 100) connected to the concentrator 200

Places indicating positions of groups that are acquired by classifying the nodes 100 (or the sensors 131 connected to the nodes 100) connected to the concentrator 200 in accordance with the set places The sensor type is the information for identifying the type of the sensor included in the wireless multi-hop network constituted of the concentrator 200. The sensor type is, for example, a sign indicating the type of the sensor to be used, such as "A" for a water level gauge and "B" for a rain gauge. Different sensor types may be allotted to rain gauges when there is a difference in the specifications thereof even though those gauges are used for the same purpose. Furthermore, different sensor types may be allotted to the sensor of the same specifications depending on the set places thereof.

The frequency level is an example of frequency information indicating the processing frequency of sensing by the sensor in a stepwise manner. FIG. 3 illustrates a case of the frequency levels expressed in three levels of "high", "intermediate", and "low". The frequency information may also be information indicating the sensing period.

In FIG. 3, the frequency information is managed for each of the concentrators 200. However, it is not intended to be limited thereto. The frequency information may be managed with small granularity as in the following.

For each sensor type
For each node 100
For each node 100 and for each sensor type of the sensor connected to the node 100

The correspondence information 522 is the data used for determining the sensing period corresponding to the frequency level for each of the sensor types. FIG. 4 is a chart illustrating an example of a data structure of the correspondence information 522. As illustrated in FIG. 4, the correspondence information 522 has a data structure in which the sensor types, the frequency levels, and the periods are associated with each other.

The determination information 523 is the information affecting the sensing, and is used when the determination unit 502 determines the frequency information. The determination information is attribute information indicating the attribute of the set place, for example. The attribute information indicates the weather information of the set place where the concentrator 200 and the corresponding wireless multi-hop network are built, for example.

The attribute information is not limited thereto but may also be earthquake information, traffic information, and state information indicating the state of the set place. The earthquake information is the information regarding an earthquake occurred in the area including the set place. The earthquake information includes the seismic intensity, the magnitude, and the like, for example. The traffic information includes the flow, traffic jam information, accident information, and the like of each road. The state information includes the water level of the dam or river existing in the area including the set place, the snowfall in the area including the set place, and the like.

Hereinafter, a case of mainly using the weather information as the determination information 523 (attribute information) will be described. The determination information 523 may simply be managed such that the weather information of the set place for each of the concentrators 200 illustrated in FIG. 3 can be specified.

The weather information includes "forecast/prediction", "observation/analysis", and "statistics" that are provided by the Meteorological Agency regarding the weather. For example, while the weather information may include warnings, advisories, typhoon conditions, weather forecasts, soil water index, surface water index, weather radar observations, analyzed precipitation, and the like, the weather information is not limited thereto.

Returning to FIG. 2, the communication unit 511 communicates with the concentrator 200 over the network 300.

The communication control unit 501 controls communication between the server 500 and the concentrator 200. For example, the communication control unit 501 transmits, to the concentrator 200, information (command or the like) indicating the sensing period determined by the determination unit 502.

Additionally, the communication control unit 501 receives the determination information 523 from an external device. For example, in a case where the weather information is used as the determination information 523, the communication control unit 501 receives the weather information from a server device providing the weather information.

The reception timing of the determination information 523 may be at any desired timing. For example, the communication control unit 501 may be configured to receive the determination information 523 transmitted from the external device when there is a change in the determination information 523. The communication control unit 501 may be configured to regularly request the external device to transmit the determination information 523.

The determination unit 502 determines the frequency information indicating the processing frequency of sensing on the basis of the determination information 523. The frequency information determination processing of the determination unit 502 may be executed at any desired timing. For example, the determination unit 502 may execute the determination processing when the communication control unit 501 receives the determination information 523 or may regularly execute the determination processing.

The determination unit 502 refers to the determination information 523 for determining the frequency levels of each of the concentrators 200 (wireless multi-hop networks) included in the network information 521.

For example, in a case where the probability of precipitation at the set place of the concentrator 200 (wireless multi-hop network) is predicted to be 0% for a while on the basis of the precipitation forecast included in the determination information 523, the determination unit 502 determines the frequency level of the rain gauge under the concentrator 200 to be the lowest (for example, as "low"). The determination unit 502 may determine to stop sensing by the rain gauge. Inversely, when heavy rain is expected in the set place, the determination unit 502 increases the frequency level of the rain gauge under the concentrator 200 (for example, as "high").

The determination unit 502 may determine the frequency level by considering the relation between the weather information and the sensing target. For example, when generation of a large amount of snowmelt water is expected due to an increase in the temperature, the determination unit 502 may determine to increase the frequency level of the water level gauge that senses the water level of a dam, a river, or the like where the snowmelt water flows in. That is, the determination unit 502 may increase the frequency level when a large change in the observation value of the sensing target is expected from the weather information and, inversely, may lower the frequency level when it is expected that there is almost no change in the observation value of the sensing target from the weather information.

When, for example, the state information indicates that the water level of a dam is high, the determination unit 502 may determine to increase the frequency level even in a case where a small amount of rainfall is expected. When, for example, the state information indicates that there is a large amount of snowfall, the determination unit 502 may determine to increase the frequency level in a case where an increase in the temperature is expected.

In the case of using the earthquake information as the determination information 523, the determination unit 502 may determine the frequency level such that a value of the frequency level is larger as a seismic intensity of the earthquake is higher.

The determination unit 502 may further determine a period during which the determined frequency level is to be applied (maintained). For example, the determination unit 502 determines the frequency level such that a high sensing period is maintained in a predetermined period for the area where a large earthquake has occurred. The sensing period (frequency level) and the period for maintaining the high sensing period may be set for each earthquake. The period may be calculated from the seismic intensity, the positional relation between the wireless multi-hop network and the earthquake area, and the like. The determination unit 502 may execute the processing for determining a new frequency level (sensing period) after the determined period has passed.

After determining the frequency level, the determination unit 502 updates the frequency level in the network information 521 stored in the storage unit 520 with the determined frequency level.

Next, the determination unit 502 determines the sensing period corresponding to the determined frequency level, and transmits, to the concentrator 200, a command to designate the sensing period. For example, the determination unit 502 refers to the correspondence information 522 as indicated in FIG. 4 for determining the sensing period corresponding to the sensor type and the frequency level. The determination unit 502 generates a command designating the determined sensing period, and transmits the command to the concentrator 200 by using the communication control unit 501.

When traffic information is used as the determination information 523 instead of the weather information, the determination unit 502 determines frequency information as follows, for example. That is, the determination unit 502 specifies the traffic volume of the set place from the traffic information, and increases the frequency level of sensing performed by an air pollution sensor when the traffic is heavy. On the other hand, the determination unit 502 lowers the frequency level of sensing performed by the air pollution sensor when the traffic is light.

In a case where the traffic information is used together with the weather information as the determination information 523, the determination unit 502 determines the frequency information as follows, for example. That is, the determination unit 502 specifies the traffic volume of the set place from the traffic information, and specifies the weather in the set place from the weather information. The determination unit 502 increases the frequency level of sensing performed by the air pollution sensor when the traffic is heavy and it is sunny, and lowers the frequency level of sensing performed by the air pollution sensor when the traffic is light or it is raining.

Through the processing as described above, it becomes possible to adjust the acquisition frequency of sensor data of the node 100 as necessary while maintaining the power saving property of the node 100.

Each of the units (the communication control unit 501 and the determination unit 502) can be implemented by one or more hardware processors. For example, each of the above-described units may be implemented by executing a computer program with a hardware processor such as a central processing unit (CPU), that is, may be implemented by software. Each of the above-described units may be implemented by a hardware processor such as a dedicated integrated circuit (IC), that is, may be implemented by hardware. Each of the above-described units may be implemented by software and hardware in combination. In a case of using multiple processors, each of the processors may implement one of the units or two or more of the units.

Next, the outline of timing control performed in the communication system according to the embodiment will be described.

The concentrator 200 transmits, to the wireless multi-hop network, the reference number (reference time information) corresponding to the reference time for calculating the timing (acquisition timing) of acquiring the sensor data. The reference number is a number serving as a reference out of the numbers indicating the communication timings, which is synchronized by time division multiplexing. As the time division multiplexing, Time-Slotted Channel Hopping (TSCH) or the like may be applied, for example. Examples of the number indicating the communication timing may include a time slot number (ASN: Absolute Slot Number), a slot frame number, and a superframe number, for example. The reference number is determined as a number corresponding to the hour (every hour on the hour including 12:00 a.m.), for example.

In each of the nodes 100, a default sensing period or a sensing period designated by the server 500 is set. The node 100 determines the next acquisition timing of the sensor data from three values that are the reference number transmitted from the concentrator 200, the current number managed by the node 100 itself, and the sensing period.

By having each of the nodes 100 execute such operations, the nodes 100 can control the acquisition timing of the sensor data. That is, it becomes also possible to synchronize the acquisition timing of the sensor data among the sensors. Furthermore, it is not necessary for the node 100 to manage the absolute time, and the timing can be controlled with a simpler configuration.

Until receiving the reference number, the node 100 repeats acquisition of the sensor data in accordance with the sensing period with the time as a starting point determined by another method (for example, time at which the node enters the network, or the like). In other words, by suspending the transmission of the reference number from the concentrator 200, the nodes 100 on the network are enabled to execute operations to which the embodiment is not applied.

Figures 5, 6:
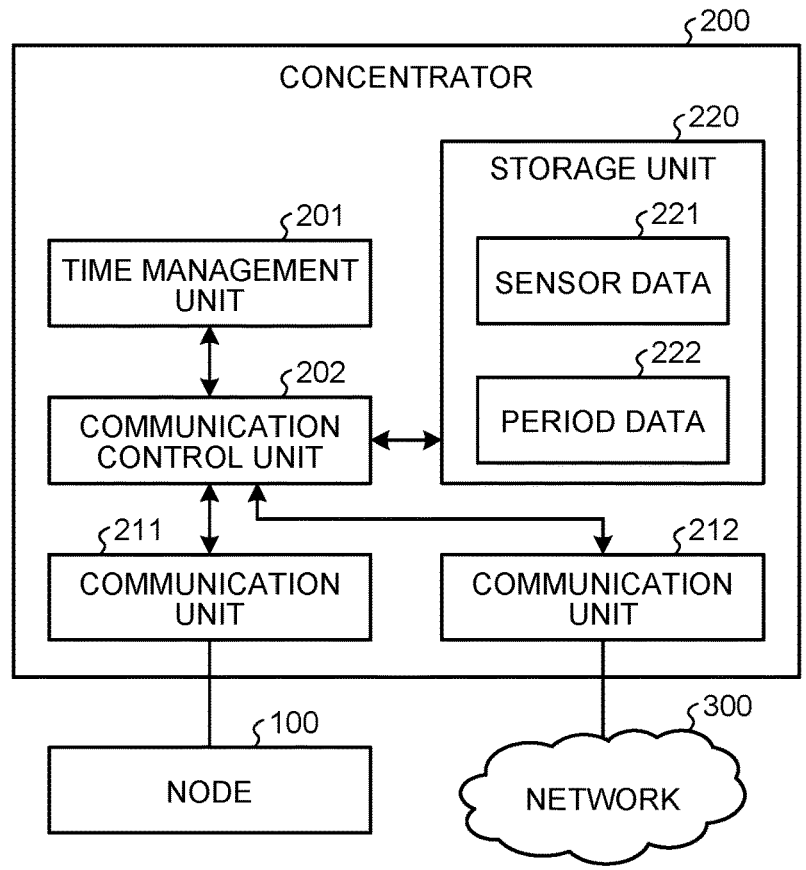
FIG. 5 is a functional block diagram of a concentrator.
FIG. 6 is a chart illustrating an example of a data structure of sensor data.

Next, a functional configuration example of the concentrator 200 will be described. FIG. 5 is a block diagram illustrating an example of the functional configuration of the concentrator 200. As illustrated in FIG. 5, the concentrator 200 includes a time management unit 201, a communication control unit 202, communication units 211, 212, and a storage unit 220.

The storage unit 220 stores various kinds of data used in the concentrator 200. For example, the storage unit 220 stores sensor data 221 transmitted from each of the nodes 100, period data 222, and data to be transmitted to each of the nodes 100, such as control information, for example. In a case where the sensor data is saved and managed in an external storage device or the like of the concentrator 200, the storage unit 220 does not need to be provided.

The storage unit 220 may be configured with various storage and memory media used in general, such as a flash memory, a memory card, a RAM, a HDD, and an optical disc.

The communication unit 211 performs communication with each of the nodes 100, and constitutes the wireless multi-hop network. In the wireless multi-hop network, communication control is performed by the time division multiplexing in the manner described above, so that the communication unit 211 operates by switching the processing for each time slot. Specifically, the communication unit 211 performs transmission processing in a time slot during which the communication unit 211 is allowed to transmit data, and the communication unit 211 performs reception processing in a time slot during which the communication unit 211 is needed to wait to receive data. In a case where there is no data in a time slot during which the communication unit 211 can transmit data, or in a case of a time slot during which neither transmission nor reception can be performed, the communication unit 211 does not perform any operations. In a time slot in which neither transmission processing nor reception processing is performed, the communication unit 211 can transit to an ultralow power consumption mode, a power off mode, or the like, and stop operations. In a period during which the communication unit 211 does not perform any operations, the entire concentrator 200 may also operate in an ultralow power consumption mode.

The communication unit 212 is used for performing communication with the network 300.

The time management unit 201 manages the current time in real time. The real time refers to the time used in daily life, with one day being 24 hours. While the time management unit 201 may acquire the current time by using any desired methods, it is possible to apply the following methods, for example.

Acquire current time information from a time server on the network 300
Acquire current time by using GPS
Acquire current time information from a base station of cellular phones
Input current time manually It is assumed that the time management unit 201 acquires current time information in a proper frequency in accordance with precision of a crystal oscillator (clock) provided to the concentrator 200 and, during operations to be described hereinafter, the time management unit 201 can always hold the current time within a margin of an error that causes no practical problem.

For example, while the concentrator 200 immediately after being shipped from a factory and immediately after being powered on may not have an accurate current time, the time management unit 201 can recognize that the concentrator 200 is in such a state as having no current time. The concentrator 200, when having no current time information, does not perform operations described hereinafter. For example, upon acquiring the current time information, the concentrator 200 starts the operations described hereinafter. After acquiring the current time information once, the concentrator 200 may or may not continue to acquire the current time information at a predetermined timing (after specific time has passed, or the like). In a case of continuing to acquire the current time information at a predetermined timing, if acquisition fails, the concentrator 200 may operate as being in a state of "having no current time information" or the concentrator 200 may continue to operate as being in a state of "having time information".

The communication control unit 202 controls communication between the nodes 100 and the network 300. For example, the communication control unit 202 switches the operations of the communication unit 211 in accordance with a schedule of the time division multiplexing. Moreover, the communication control unit 202 performs construction and maintenance of the wireless multi-hop network, and reception and transfer processing of the sensor data transmitted via the wireless multi-hop network. The communication control unit 202 may or may not transfer the sensor data received via the communication unit 212 to the network 300. Moreover, the communication control unit 202 may or may not store the sensor data in the storage unit 220. Moreover, the communication control unit 202 may or may not transfer the sensor data saved in the storage unit 220 to the network 300. Moreover, the communication control unit 202 performs transmission processing of control information and the like to the nodes 100.

FIG. 6 is a chart illustrating an example of a data structure of the sensor data 221 stored in the storage unit 220. The sensor data is stored by being associated with a node identifier and acquisition time. The node identifier is an example of identification information for identifying the node 100 as the sender of the sensor data. The acquisition time is the time at which the sensor data is acquired.

In addition to the value acquired (value read out) from the sensor, the sensor data is transmitted to the concentrator 200 along with the time slot number for which the value is acquired. The concentrator 200 uses the time management unit 201 and the communication control unit 202 to calculate the corresponding real time from the time slot number included in the sensor data. With such processing, the sensor data can be managed along with the acquisition time. The concentrator 200 may treat the time slot number directly as the acquisition time without converting the acquisition time to the real time. Furthermore, while the time at which the concentrator 200 received each sensor data can also be managed with the same method, the associated reception time may or may not be recorded in the storage unit 220.

Returning to FIG. 5, the communication control unit 202 communicates with the server 500 through the network 300 and the communication unit 212. For example, the communication control unit 202 receives a command to designate the sensing period from the server 500. Upon receiving the command designating the sensing period from the server 500, the communication control unit 202 updates the period in the period data 222 in the storage unit 220 with the sensing period designated by the received command.

Figures 7, 8:
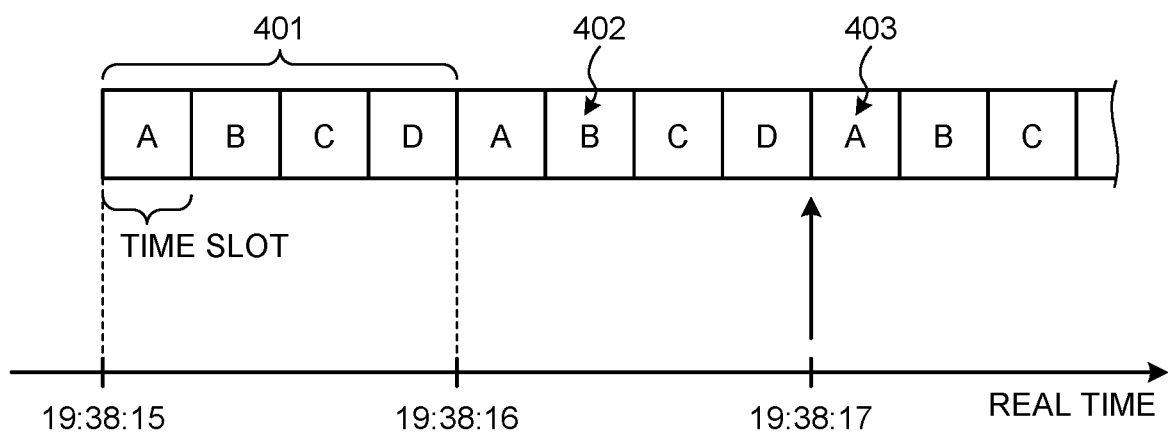
FIG. 7 is a chart illustrating an example of a data structure of period data.
FIG. 8 is a chart illustrating a relation between real time and time slots of time division multiplexing.

FIG. 7 is a chart illustrating an example of the data structure of the period data 222. As illustrated in FIG. 7, the period data 222 is data in which the sensor types and the periods are associated with each other. As described above, the value of the period of each sensor type may be changed in accordance with the command from the server 500.

Returning to FIG. 5, the communication control unit 202 transmits, to the node 100, the processing frequency of the processing determined on the basis of the frequency information. For example, the communication control unit 202 transmits, to the node 100, the information indicating the period designated in the period data 222 in the storage unit 220. While any method may be used for transmitting the information indicating the period, the communication control unit 202 transmits a frame including the sensing period for each sensor type to each of the nodes 100 along with the reference number, for example.

Each of the above-described units (the time management unit 201, the communication control unit 202) can be implemented by one or more hardware processors, for example. For example, each of the above-described units may be implemented by executing a computer program with a processor such as a CPU, that is, may be implemented by software. Each of the above-described units may be implemented by a processor such as a dedicated IC, that is, may be implemented by hardware. Each of the above-described units may be implemented by using software and hardware in combination. In a case of using multiple processors, each of the processors may implement one of the units or two or more of the units.

An example of the communication control of the time division multiplexing executed by the communication control unit 202 will be described herein. FIG. 8 is a chart illustrating a relation between real time and time slots of the time division multiplexing. As illustrated in FIG. 8, it is assumed that the concentrator 200 starts the wireless multi-hop network at 19:38:15. The length of a single time slot is 250 milliseconds, and four time slots are defined as a schedule unit 401 of the time division multiplexing. That is, if the schedule does not change after 19:38:15, the same communication schedule is repeated every second. Note that A, B, C, and D denote four schedules to be executed every second.

A time slot number is given to each of the time slots. In an example of FIG. 8, assuming that the time slot number of the time slot immediately after the concentrator 200 starts the wireless multi-hop network is an integer n, a time slot number n+5 is given to the time slot 402 that is the sixth time slot. For example, assuming that the time slot number n of the first time slot (the time slot corresponding to A at the left end in FIG. 8) is 0, the time slot number of the time slot 402 is 5. Basically, the time slot number monotonically increases. When there is an upper limit value in the time slot number, the time slot number returns to 0 after reaching the upper limit value, and starts monotonically increasing again.

Such communication schedule and time slot numbers of the time division multiplexing are managed by the communication control unit 202 of the concentrator 200. The communication control unit 202 can acquire the correspondence between the real time and the time slot number by acquiring the current time from the time management unit 201. In the example of FIG. 8, the communication control unit 202 can determine that the time slot 403 having the time slot number n+8 starts at 19:38:17.

The communication control unit 202 transmits the time slot number corresponding to the current time to the wireless multi-hop network via the communication unit 211 regularly or upon receiving an instruction from the network 300. The types of frames (packets) for the transmission are not specifically limited. Beacon frames or data frames may be used. Those frames may be broadcasted or unicasted to each of the nodes 100 neighboring to the concentrator 200. In any case, by transmitting the time slot number from the concentrator 200, the nodes 100 neighboring to the concentrator 200 acquire the time slot number corresponding to a certain time. The transmitted time slot number is called a reference time slot number. The reference time slot number is an example of the reference number.

Figure 9:
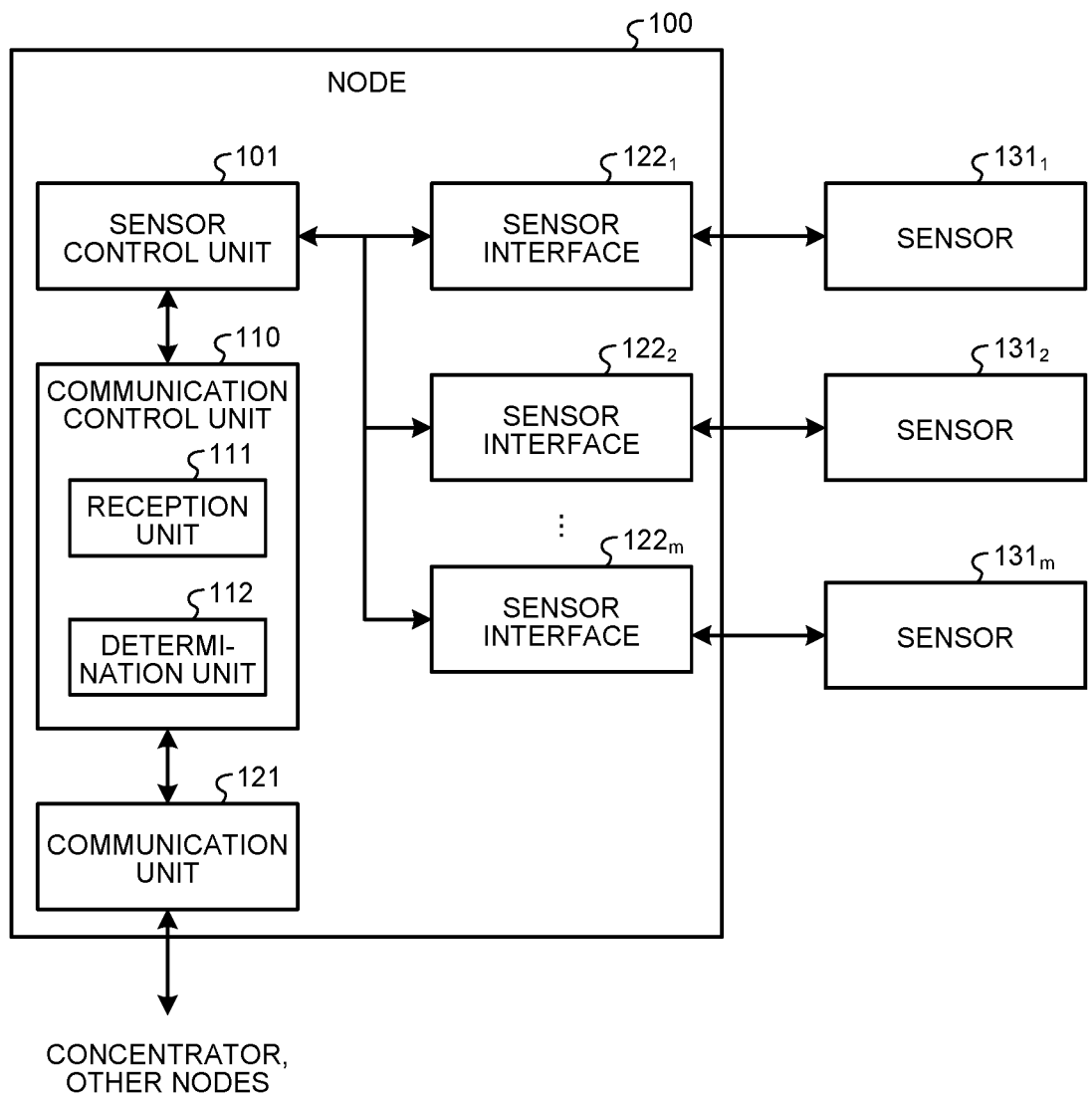
FIG. 9 is a functional block diagram of a node.

Next, the configuration of the node 100 will be described. FIG. 9 is a block diagram illustrating an example of the functional configuration of the node 100. As illustrated in FIG. 9, the node 100 includes a sensor control unit 101 (an example of the control unit), a communication control unit 110, a communication unit 121, and one or more sensor interfaces $122_1$ to $122_m$ (m is an integer of one or a larger value).

Each of the sensor interfaces $122_1$ to $122_m$ is connected to respective sensors $131_1$ to $131_m$. The sensor interfaces $122_1$ to $122_m$ are simply referred to as the sensor interfaces (or sensor interface) 122 when not necessary to be distinguished from each other. Furthermore, the sensors $131_1$ to $131_m$ are simply referred to as the sensors (or sensor) 131 when not necessary to be distinguished from each other.

The communication unit 121 performs the similar operations to those of the communication unit 211 of the concentrator 200.

The communication control unit 110 switches the operations of the communication unit 121 in accordance with the communication schedule of the time division multiplexing like the communication control unit 202 of the concentrator 200. The communication control unit 110 detects and connects to the wireless multi-hop network started by the concentrator 200, and performs setting, alteration, and the like of the communication path and communication schedule. For such operations, the communication control unit 110 performs transmission and reception of control frames including beacons with the other nodes 100 via the communication unit 121.

The communication control unit 110 includes a reception unit 111 and a determination unit 112 (an example of a second determination unit). The reception unit 111 receives data from the concentrator 200. For example, the reception unit 111 receives the reference number and the sensing period from the concentrator 200.

The determination unit 112 determines a processing timing of predetermined processing, on the basis of the reference number. While the predetermined processing and the processing timing are processing of acquiring the sensor data and an acquisition timing thereof, respectively, it is not intended to be limited thereto. The determination unit 112 is not necessarily provided inside the communication control unit 110, but may be provided outside the communication control unit 110. For example, the determination unit 112 may be provided inside the sensor control unit 101. Details of the functions of the reception unit 111 and the determination unit 112 will be described later.

The sensor control unit 101 acquires the sensor data via the sensor interfaces 122. The acquired sensor data is transmitted to the wireless multi-hop network via the communication control unit 110. Typically, the communication control unit 110 transmits the sensor data to the concentrator 200 as the destination. In the sensor control unit 101, the sensing period (the default sensing period, or the sensing period designated from the concentrator 200) is set for each of the sensor interfaces 122. The sensor control unit executes the acquisition processing of the sensor data in accordance with the set sensing period. Furthermore, in a case where there is a request for acquiring the sensor data from the wireless multi-hop network, or the like, the sensor control unit 101 acquires the sensor data regardless of the sensing period set in advance and transmits the sensor data to the requester via the communication control unit 110.

The sensor interface 122 inquires the sensor data to the connected sensor 131 to acquire the sensor data in response to the request from the sensor control unit 101. In a case where the sensor 131 is a rain gauge that generates a pulse for a specific observed value, the sensor data cannot be acquired by inquiring to the sensor 131. When such a sensor 131 is connected to the sensor interface 122, the sensor interface 122 manages an integrated value on the basis of the pulse and the like received from the sensor 131. At this time, the storage unit (memory) for managing the integrated value may be provided outside the sensor interface 122. A memory area for managing the integrated value may be included in the sensor interface 122. When the so-called preliminary energization or preheat is required for acquiring the sensor data, preliminary energization is started in advance by counting backwards from the time slot to acquire the sensor data.

Each of the above-described units (the sensor control unit 101, the communication control unit 110) can be implemented by one or more hardware processors, for example. For example, each of the above-described units may be implemented by executing a computer program with a processor such as a central processing unit (CPU), that is, may be implemented by software. Each of the above-described units may be implemented by a processor such as a dedicated integrated circuit (IC), that is, may be implemented by hardware. Each of the above-described units may be implemented by using software and hardware in combination. In a case of using multiple processors, each of the processors may implement one of the units or two or more of the units.

Figure 10:
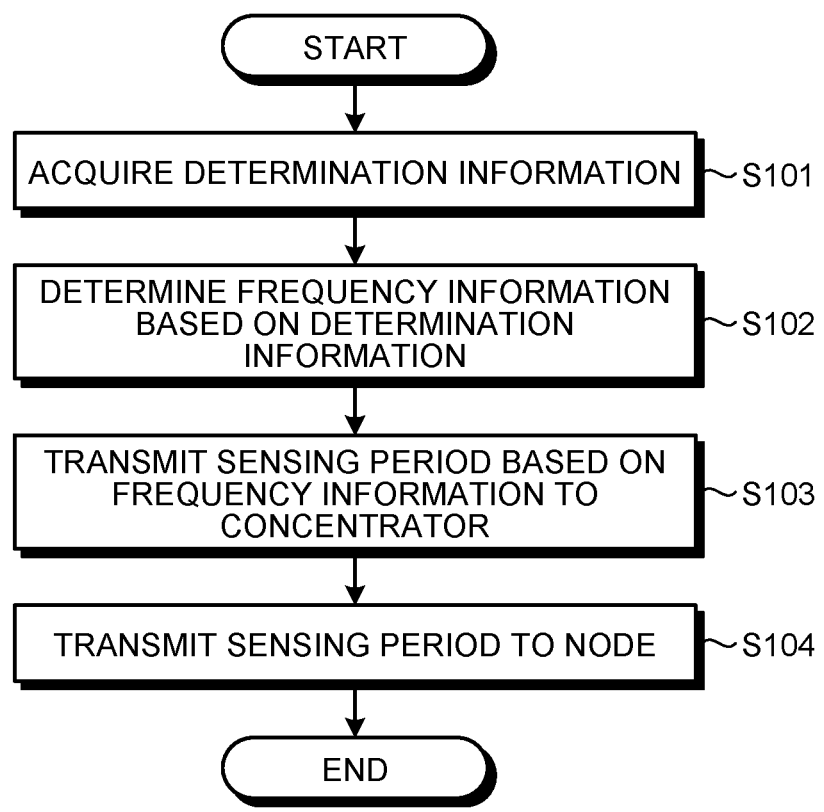
FIG. 10 is a flowchart of frequency determination processing according to the embodiment.

Next, frequency determination processing executed by the server system (the server 500, the concentrator 200) will be described. FIG. 10 is a flowchart illustrating an example of the frequency determination processing according to the embodiment.

The communication control unit 501 acquires the weather information as the determination information 523 from, for example, a server device that provides the weather information, and stores the weather information in the storage unit 520 (step S101). The determination unit 502 determines the frequency information of sensing performed by the node 100 on the basis of the determination information 523 (step S102).

The communication control unit 501 transmits the sensing period determined on the basis of the frequency information to the concentrator 200 (step S103). The sensing period determined on the basis of the frequency information is a sensing period determined by the determination unit 502 with reference to the correspondence information 522 as illustrated in FIG. 4, for example.

The concentrator 200 transmits the sensing period received from the server 500 to each of the nodes 100 (step S104). For example, the communication control unit 202 of the concentrator 200 transmits a frame including the reference number and the sensing periods of each of the sensor types to each of the nodes 100.

Figure 11:
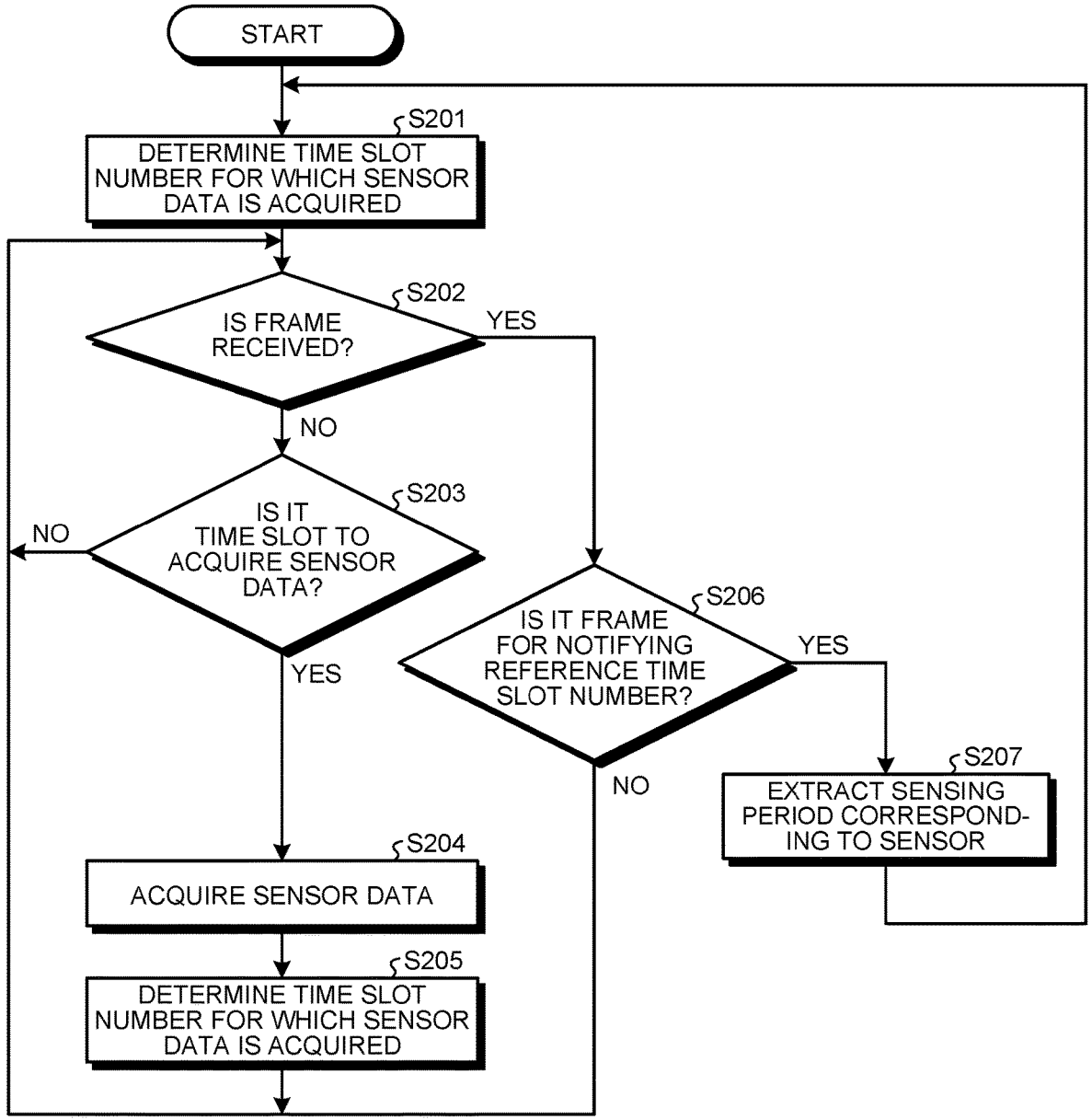
FIG. 11 is a flowchart of data acquisition processing according to the embodiment.

Next, data acquisition processing executed by the node 100 will be described. FIG. 11 is a flowchart illustrating an example of the data acquisition processing according to the embodiment.

The node 100 starts the data acquisition processing illustrated in FIG. 11 when, for example, it is connected to the wireless multi-hop network.

The determination unit 112 determines a time slot number for which the sensor data is to be acquired next (step S201). For example, the determination unit 112 determines the time slot number for which the sensor data is to be acquired next in accordance with the default sensing period.

Thereafter, the reception unit 111 enters a state of waiting to receive the data, and determines whether a frame has been received (step S202). Note that, when the node 100 is connected to the wireless multi-hop network, a time slot expected to receive a frame is determined. Thus, even in a state of waiting to receive the data, there is no need to continuously perform waiting of frame reception in time slots other than a time slot expected to receive a frame. When a frame is not received (No at step S202), the sensor control unit 101 determines whether the current time slot number is a time slot number for which the sensor data is to be acquired (step S203). When the current time slot number is not the time slot number for which the sensor data is to be acquired (No at step S203), the processing is returned to step S202 and repeated therefrom. Note that, when the current time slot number is the next reference time slot number estimated by the node 100 itself, the estimated next reference time slot number may be taken as the current reference time slot number, and may estimate a following next reference slot number.

When the current time slot number is the time slot number for which the sensor data is to be acquired (Yes at step S203), the sensor control unit 101 acquires the sensor data from the sensor 131 (step S204). Note that waiting to receive the data (step S202) and determination of acquisition of the sensor data (step S203) may be performed in an inverted order. In a case where the so-called preliminary energization or preheat is required for acquiring the sensor data, when it is determined as a result of counting backwards from the time slot to acquire the sensor data next that it is necessary to start preheat from the current time slot, preheat is started.

After acquiring the sensor data, the determination unit 112 determines the time slot number for which the sensor data is to be acquired next, by adding the sensing period to the current time slot number for which the current sensor data is acquired (step S205). In a case where the next reference time slot number is estimated by the node 100 itself and the next time slot number for which the sensor data is to be acquired is a future number with respect to the next reference time slot number, the determination unit 112 may determine the next time slot number, for which the sensor data is to be acquired, as the next reference time slot number.

When a frame is received at step S202 (Yes at step S202), the determination unit 112 determines whether the received frame is a frame serving to give notification of the reference time slot number (step S206). When it is the frame serving to give notification of the reference time slot number (Yes at step S206), the determination unit 112 extracts the sensing period corresponding to the sensor 131 provided to the node 100 from the sensing periods of each of the sensor types included in the same frame (step S207). Then, returning to step S201, the determination unit 112 determines the time slot number for which the sensor data is to be acquired next, on the basis of the extracted sensing period and the notified reference time slot number. The extracted sensing period is stored in the storage unit or the like in the node 100 for the latter processing. Note that, before receiving the next reference time slot number, the sensor node 100 may estimate by itself the next reference slot number by using the information on an time interval (for example, 1 hour in a case of every hour on the hour) between the reference time slot and the next reference time slot and by using the current reference time slot number. While the information on the interval at which the reference time slot is updated may be recorded in advance in the sensor node 100, for example, it is not limited only to such a method.

When it is not the frame serving to give notification of the reference time slot number (No at step S206), the processing is returned to step S202 and repeated therefrom.

An example of setting the acquisition timing of the sensor data will be described. For example, the concentrator 200 transmits the reference time slot number corresponding to every hour on the hour. The node 100 sets a sensing period of 20 minutes for the sensor 131, for example. In that case, the node 100 determines the acquisition timing to acquire the sensor data at 0 minute, 20 minutes, and 40 minutes past every hour.

Next, details of the determination method of the time slot number at step S201 will be described. The determination unit 112 determines the time slot number for which the sensor data is to be acquired as follows.

When the node 100 has no reference time slot number or when the reference time slot number is the same as the current time slot number, the determination unit 112 determines the current time slot number as the time slot number for which the sensor data is to be acquired next. In a case where the node 100 has no reference time slot number, when the so-called preliminary energization or preheat is necessary for acquiring the sensor data, a time slot number acquired by adding the number of time slots corresponding to the time required for the preliminary energization to the current time slot number is determined as the time slot number for which the senor data is to be acquired next.

The determination unit 112 determines the time slot number for which the senor data is to be acquired next, on the basis of a value that is acquired by adding an integral multiple of the current sensing period to the reference time slot number. The value corresponds to a future time closest to the current time.

When, for example, the reference time slot number is a future time slot number, the determination unit 112 determines, as the time slot number for which the sensor data is to be acquired next, a future time slot number closest to the current time slot number from among time slot numbers that match the reference time slot number as a result of adding an integral multiple of the current sensing period.

When the reference time slot number is a past time slot number, the determination unit 112 determines, as the time slot number for which the sensor data is to be acquired next, a future time slot number closest to the current time slot number from among time slot numbers acquired as a result of adding an integral multiple of the current sensing period.

In a case where the processing of step S201 is executed after receiving the reference time slot number (Yes at step S206) when the already held reference time slot number and a reference time slot number received anew are the same, the determination unit 112 may or may not recalculate the time slot number for which the sensor data is to be acquired next. However, as for the sensing periods of each of the sensor types, the value received lastly is stored as the set value of the latest sensing period and used for determining the time slot number for which the sensor data is to be acquired.

After receiving the reference time slot number and the sensing periods of each of the sensor types transmitted from the concentrator 200, the node 100 retransmits the received reference time slot number and the sensing periods of each of the sensor types to the other connected nodes 100 in the same method as that performed by the concentrator 200. Thereby, the reference time slot number and the sensing periods of each of the sensor types transmitted from the concentrator 200 are transmitted throughout the entire wireless multi-hop network.

With the processing described above, the acquisition timing of the sensor data for each of the nodes 100 can be controlled in accordance with the reference time slot number transmitted from the concentrator 200 without having each of the nodes 100 manage the absolute time. Moreover, the sensing periods of each of the sensor types corresponding to the weather information are set, so that it becomes possible to adjust the acquisition frequency of the sensor data in a more detailed manner while maintaining the power saving property of the nodes 100.

Modification Example 1

The communication system may include a relay node (relay device). The relay node is a node having a function of relaying (transferring) the sensor data transmitted from another node 100. For example, in the structural units of the node 100 illustrated in FIG. 9, the relay node does not need to include part of or a whole part of the functions (the sensor interface 122, the sensor control unit 101, and the determination unit 112) for acquiring the sensor data.

The node 100 in the configuration as illustrated in FIG. 9 may operate as the relay node. For example, the node 100 may operate as the relay node when detecting that the sensor 131 is not connected at startup. Moreover, the node 100 may operate as the relay node when an operation mode of operating as the relay node is set in advance for the node 100.

Modification Example 2

The determination unit 112 may determine the next acquisition timing of the sensor data by considering, in addition to the sensing period, an offset from the reference time slot number. For example, an offset from the reference time slot number is set for each of the sensor interfaces 122. The offset may be a numerical value that can be directly added to the reference time slot number or may be expressed in a form (for example, time) that can be converted to a numerical value.

The determination unit 112 calculates a new reference time slot number (update number) by adding the set offset to the reference time slot number for each of the sensor interfaces 122. The determination unit 112 determines the time slot number for which the sensor data is to be acquired next in the same manner as that in the embodiment described above by using the new reference time slot number. When the time slot number is not notified, the determination unit 112 ignores the offset and determines the time slot number for which the sensor data is to be acquired next.

A setting example of the acquisition timing of the sensor data according to the present modification example will be described. For example, the concentrator 200 transmits the reference time slot number every hour on the hour. In the node 100, a sensing period of 20 minutes and an offset of 10 minutes are set, for example. In that case, the node 100 determines the acquisition timing to acquire the sensor data at 10, 30, and 50 minutes past every hour.

Modification Example 3

The concentrator 200 may transmit the reference time slot number determined for each of the nodes 100 to the wireless multi-hop network. For example, the concentrator 200 determines a future time slot number for which the sensor data is supposed to be acquired for each of the nodes 100, and transmits the future time slot number to the corresponding node 100 as the destination. Each of the nodes 100 determines the time slot number for which the sensor data is to be acquired in the same manner as that of the embodiment on the basis of the reference time slot number transmitted to the node itself. Each of the nodes 100 transmits the acquired sensor data to the wireless multi-hop network.

By changing the reference time slot number for each of the nodes 100, acquisition timings of multiple pieces of sensor data can be flexibly aligned.

Modification Example 4

The concentrator 200 may transmit the reference time slot number determined for each of the nodes 100 and for each types of the sensors 131 (each sensor type) to the wireless multi-hop network. For example, the concentrator 200 determines a future time slot number for which the sensor data is to be acquired for each of the nodes 100 and each of the sensor types, and transmits the future time slot number to the corresponding node 100 as the destination. Identification information for identifying the sensor type to be applied is added to the reference time slot number. Each of the nodes 100 determines, on the basis of the reference time slot number transmitted to itself, the time slot number for which the sensor data is to be acquired for the sensor 131 corresponding to the sensor type identified by the identification information. Each of the nodes 100 transmits the sensor data acquired from the corresponding sensor 131 to the wireless multi-hop network.

By changing the reference time slot number for each of the nodes 100 and each of the sensor types, acquisition timings of multiple pieces of sensor data can be flexibly aligned.

Modification Example 5

The examples using the time slot number as the number mainly indicating the communication timing has been described heretofore. It is also possible to have a configuration in which a reference slot frame number is transmitted as the reference number and the slot frame number is used as the number indicating the communication timing. The concentrator 200 may transmit an offset of the time slot in a slot frame in addition to the slot frame number for giving notification of the reference time with higher precision. The offset of the time slot is an offset for the first time slot in the slot frame, for example.

Figure 12:
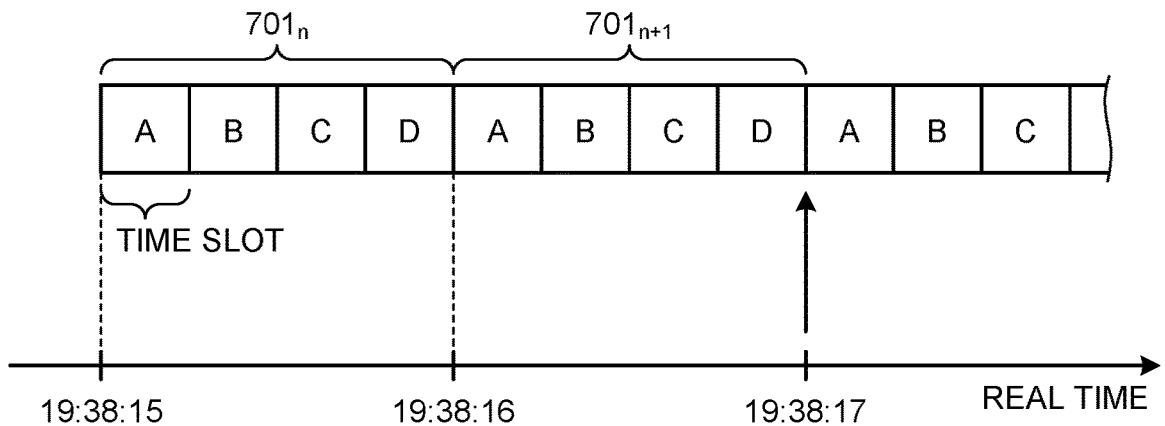
FIG. 12 is a chart illustrating a relation between real time and slot frames of the time division multiplexing.

FIG. 12 is a chart illustrating a relation between real time and slot frames of the time division multiplexing. The slot frame is a unit of a schedule including a specific number of time slots. In FIG. 12, slot frames $701_n$ and $701_{n+1}$ each include four time slots. Similar to the time slot, the slot frame is given a slot frame number.

Modification Example 6

Figure 13:
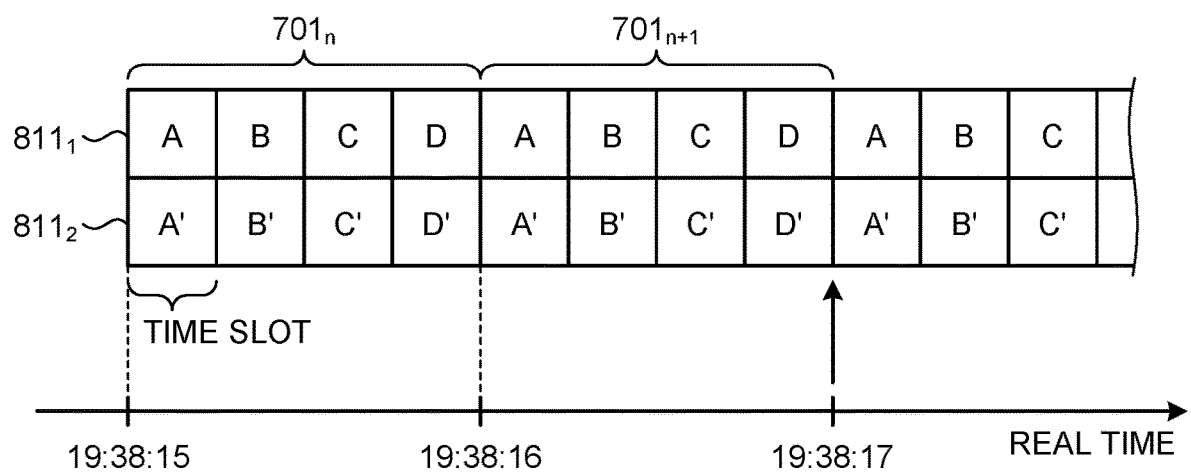
FIG. 13 is a chart illustrating a relation between real time and slot frames of the time division multiplexing.

Depending on a type of time division multiplexing, there may be a case where one or more channels (frequencies) are used. For example, with TSCH, the channel to be used is changed every time when data is transmitted or received. The method of the embodiment described above can be applied to such time division multiplexing as well. FIG. 13 is a chart illustrating a relation between real time and slot frames of the time division multiplexing in a case of using two channels $811_1$ and $811_2$.

In a communication schedule of such time division multiplexing, a channel used for communication is designated in addition to the time slot number. The channel may be designated by a channel offset. The concentrator 200 and the nodes 100 transmit and receive the reference numbers and the sensor data by using the designated channel.

Modification Example 7

It is also possible to have a configuration in which a reference superframe number is transmitted as the reference number and a superframe number is used as the number indicating the communication timing.

Figure 14:
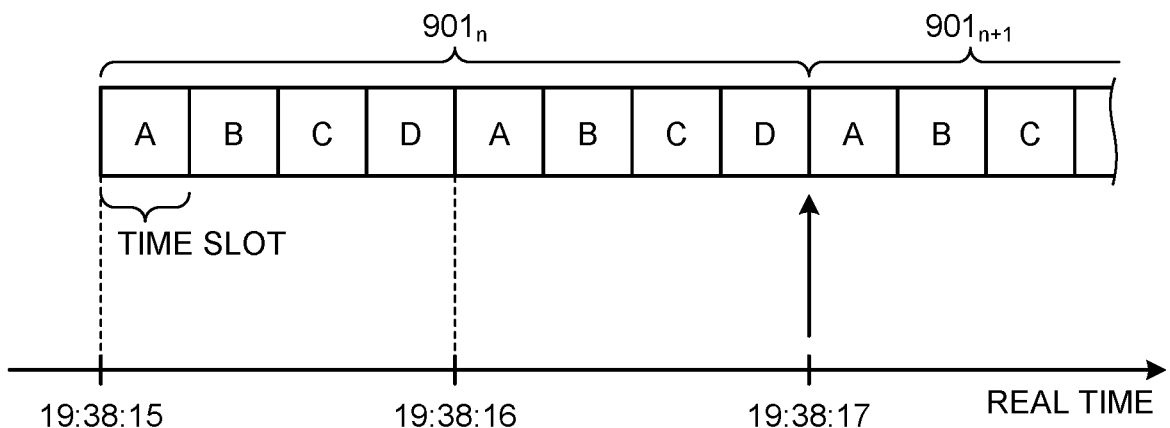
FIG. 14 is a chart illustrating a relation between real time and superframes of the time division multiplexing.

FIG. 14 is a chart illustrating a relation between real time and superframes of the time division multiplexing. A superframe is a unit of a schedule including a specific number of slot frames. FIG. 14 illustrates an example that superframes $901_n$ and $901_{n+1}$ each includes two slot frames. The superframe is given a superframe number.

A period of the superframe is longer than that of the time slot. For giving notification of the reference time with still higher precision, the concentrator 200 may transmit an offset of the time slot in the superframe in addition to the superframe number. The offset of the time slot is an offset for the first time slot in the superframe, for example.

There may be a case where the node 100 is set to acquire sensor data in a fixed time slot (for example, the first time slot) in the superframe. In such a case, the determination unit 112 determines, as the time slot corresponding to a new reference number, a time slot corresponding to the fixed time slot closest in the past or the fixed time slot closest in the future from among time slots identified by the reference superframe number and the offset of the time slot. Then, the determination unit 112 determines, by using the new reference number, the time slot number for which the sensor data is to be acquired next in the same manner as that of the embodiment described above.

Modification Example 8

The examples of controlling the timing of mainly the processing of acquiring the sensor data have been described heretofore. As described above, the processing defined in advance may be other than the processing of acquiring the sensor data. It is also possible to apply the method of the above-described embodiment when controlling, for example, the timing of the following processing.

On/off control of a light bulb

Moving control of an actuator and the like

Modification Example 9

In the embodiment described above, the server 500 determines the frequency level ("high", "intermediate", or "low") and also determines the sensing periods corresponding to the frequency levels. The determination processing of the sensing period corresponding to the frequency level may be executed by the concentrator 200. For example, the server 500 (the communication control unit 501) transmits, to the concentrator 200, a command indicating the frequency level of each of the sensor types.

The storage unit 220 of the concentrator 200 stores the correspondence information 522 as in FIG. 4. Similar to the determination unit 502 of the server 500, the concentrator 200 has a function of determining the sensing period corresponding to the frequency level and the sensor type by referring to the correspondence information 522. With the sensing period determined by using the function, the period in the period data 222 is updated.

Modification Example 10

The determination unit 502 may determine the frequency information on the basis of a determination of whether a failure has occurred in sensing. For example, the concentrator 200 (the communication control unit 202) calculates a change in sensor data received from the node 100. Upon detecting a change exceeding a predetermined threshold value or a change below the threshold value (hereinafter, those changes are called unusual changes), the concentrator 200 gives to the server 500 notification indicating that an unusual change is detected.

The determination unit 502 of the server 500 upon receiving the notification of the unusual change determines a new sensing period by referring to the determination information 523 or the like. The determination unit 502 may execute at least one of determination whether the unusual change is a temporal anomaly and determination of the cause of the unusual change, and determine the sensing period in accordance with the determination result. For example, in response to determining that the unusual change is a temporal anomaly and when determined that the cause of the unusual change is a failure of the device (the node 100, the sensor 131, or the like), the determination unit 502 may not change the sensing period.

Detection of the unusual change may be executed not by the concentrator 200 but by the server 500. In that case, the concentrator 200 transmits the sensor data to the server 500.

The threshold value for determining the anomaly may be changed by an operation of the user or may be changed in accordance with the determination information 523 or the like. In a case where the concentrator 200 detects the unusual change, the change of the threshold value may be notified to the concentrator 200 from the server 500 with a command.

As described above, with the communication system according to the embodiment, it is possible to set the processing frequency of the processing (acquisition processing of the sensor data and the like) executed by the communication apparatus in a more detailed manner. Furthermore, with the communication system according to the embodiment, it is unnecessary to manage the absolute time and possible to control the timing with a simpler configuration.

Figure 15:
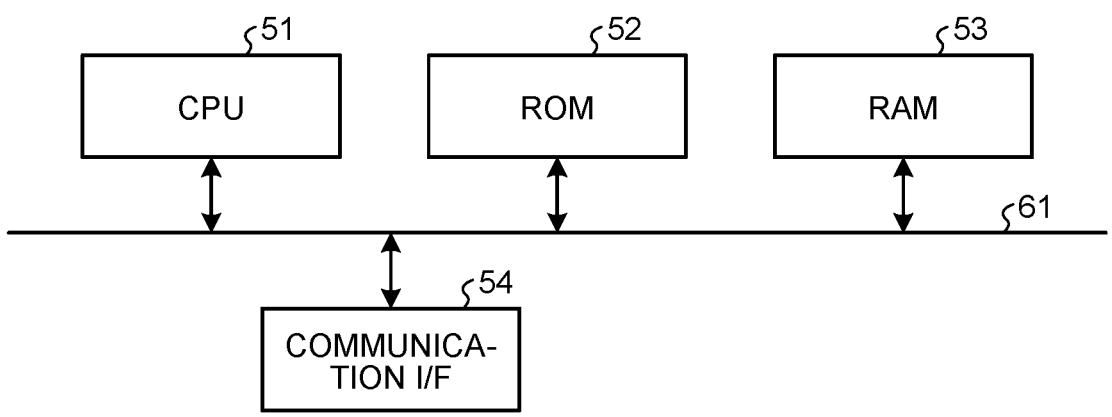
FIG. 15 is a block diagram of hardware of a device according to the embodiment.

Next, a hardware configuration of devices according to the embodiment (the server 500, the concentrator 200, and the node 100) will be described by referring to FIG. 15. FIG. 15 is an explanatory diagram illustrating an example of the hardware configuration of the devices according to the embodiment.

The devices according to the embodiment each include a control device such as a CPU 51, memory devices such as a read only memory (ROM) 52 and a random access memory (RAM) 53, a communication I/F 54 for performing communication by connecting to a network, and a bus 61 for connecting each of the units.

A computer program executed by the device according to the embodiment is provided by being loaded in advance on the ROM 52 or the like.

The computer program executed by the device according to the embodiment may be configured to be provided as a computer program product in an installable file form or an executable file form by being recorded on a non-transitory computer-readable recording medium, such as a compact disc read only memory (CD-ROM), a flexible disc (FD), a compact disc recordable (CD-R), or a digital versatile disc (DVD).

Moreover, the computer program executed by the device according to the embodiment may be provided by being stored on a computer that is connected to a network such as the Internet and downloaded over the network. The computer program executed by the device according to the embodiment may be provided or distributed over a network such as the Internet.

The computer program executed by the device according to the embodiment may cause a computer to function as each of the units of the device described above. The computer enables the CPU 51 to load the computer program on a main memory from the computer readable storage medium, so as to execute the computer program.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A communication system comprising:
a server system; and
a plurality of communication apparatuses, wherein
the server system includes a server and a concentrator, the concentrator being a device concentrating sensor data transmitted from each of the plurality of communication apparatuses,
the concentrator and the plurality of communication apparatuses configure a wireless multi-hop network,
the server includes one or more first hardware processors configured to:
    determine a level indicating processing frequency of predetermined processing in a stepwise manner, the predetermined processing being processing of acquiring sensor data from a plurality of sensors connected to each of the plurality of communication apparatuses, the level being determined based on determination information affecting the predetermined processing, the determination information being attribute information indicating an attribute of a set place where the server system, the plurality of communication apparatuses, or the plurality of sensors are each set, the determination information being obtained from an external device other than the plurality of communication apparatuses connected to the plurality of sensors; and
    transmit the level to the concentrator;
the concentrator includes one or more second hardware processors configured to:
    determine a period of the predetermined processing based on the level that is transmitted; and
    transmit the period of the predetermined processing to the plurality of communication apparatuses, and
each of the plurality of communication apparatuses includes one or more third hardware processors configured to:
    receive the period of the predetermined processing from the concentrator; and
    execute the predetermined processing based on the period.

2. The communication system according to claim 1, wherein the attribute information is at least one of weather information and traffic information of the set place.

3. The communication system according to claim 1, wherein
the attribute information includes information regarding an earthquake, and
the first hardware processors determine the level such that a value of the level is larger as a seismic intensity of the earthquake is higher.

4. The communication system according to claim 1, wherein
the predetermined processing is processing of acquiring sensor data from the plurality of sensors connected to each of the plurality of communication apparatuses, and
the first hardware processors determine the level based on a determination of whether a failure has occurred in the processing of acquiring the sensor data.

5. The communication system according to claim 1, wherein the first hardware processors
determine the level anew after the period has passed.

6. The communication system according to claim 1, wherein
the second hardware processors
communicate with the plurality of communication apparatuses by a communication method of synchronizing a number indicating a communication timing, and
further transmit a reference number indicating the number serving as a reference, and
the third hardware processors determine a processing timing of the predetermined processing based on the reference number.

7. The communication system according to claim 1, wherein the first hardware processors
receive the determination information transmitted from the external device when the determination information is changed.

8. The communication system according to claim 1, wherein the first hardware processors
periodically send, to the external device, a request to transmit the determination information and receive the determination information transmitted from the external device in response to the request.

9. The communication system according to claim 6, wherein
a communication control in the wireless multi-hop network is performed by a time division multiplexing,
the number indicating the communication timing includes at least one of a time slot number, a slot frame number, and a superframe number of the time division multiplexing, and
the reference number includes at least one of a reference time slot number, a reference slot frame number, and a reference superframe number.

10. The communication system according to claim 1, wherein
the second hardware processors transmit a frame including the period of the predetermined processing along with a reference number.

11. The communication system according to claim 1, wherein
the first hardware processors determine the level such that a value of the level is larger as a change in the sensor data is larger.

* * * * *